Aug. 11, 1931.  B. H. SCOTT  1,818,508
DRILL STEM
Filed May 25, 1929  2 Sheets-Sheet 1

INVENTOR.
Bernard N. Scott
BY
ATTORNEYS.

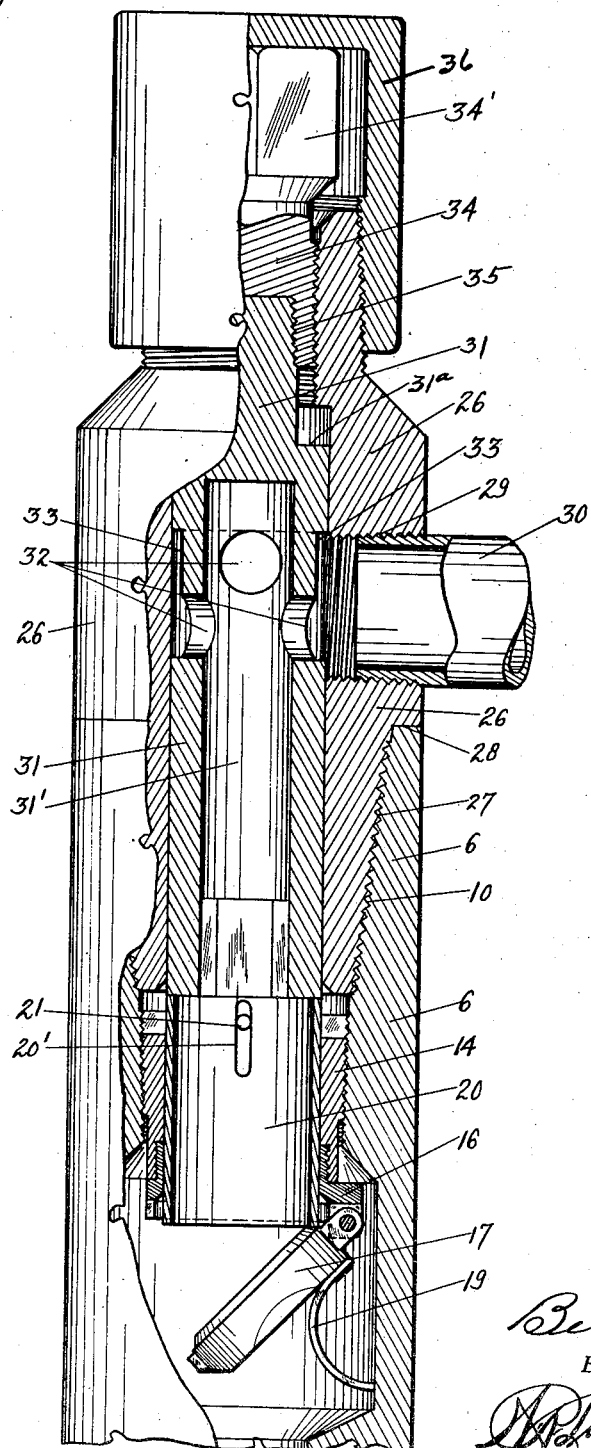

Patented Aug. 11, 1931

1,818,508

UNITED STATES PATENT OFFICE

BERNARD H. SCOTT, OF GLENDALE, CALIFORNIA

DRILL STEM

Application filed May 25, 1929. Serial No. 366,072.

My invention relates to drill stems, and more specifically to valve mechanism located in a tool joint in such a way that it in no way interferes with the regular opening through said tool joint and which will be automatic in its action for closing said opening through said tool joint in case a well in which it is located commenced to flow or in case of blowout through the drill pipe.

Among the salient objects of my invention are: to provide in combination with a tool joint a valve mechanism which can be held open under normal conditions and which will automatically close in case of flow or blowout through the drill pipe; to provide such a mechanism which is automatically opened and held open when the two parts of a tool joint are screwed together and which automatically closes when the pin end of a tool joint is removed therefrom; to provide in a tool joint a recess outside of the regular passageway through the joint in which a valve can be positioned and adapted to move across said passageway in order to close the same, with a tubular member or sleeve which is operable to move said valve into said recess and to cover said valve member and said recess, said tubular member or sleeve forming the normal passageway through the joint; to provide a mechanism of the character referred to which can be embodied in an intermediate member to be interposed between the two parts of the standard tool joint, or which can be embodied in the box end of the standard tool joint; to provide in combination with a mechanism of the character referred to a connecting device which can be substituted for the pin end of a tool joint for the purpose of connecting the drill pipe with a pipe line, said connecting device having means for opening the valve when in place, whereby to open the drill pipe into communication with a pipe line, thus making it possible to accomplish the connection of a drill pipe with a pipe line without opening the valve and thereafter to open the valve and permit any flow from the drill pipe to the pipe line.

Other advantages and objects of my invention will be recognized from the following description of one practical embodiment thereof, shown on the accompanying two sheets of drawings, which I will now describe.

Figure 1:
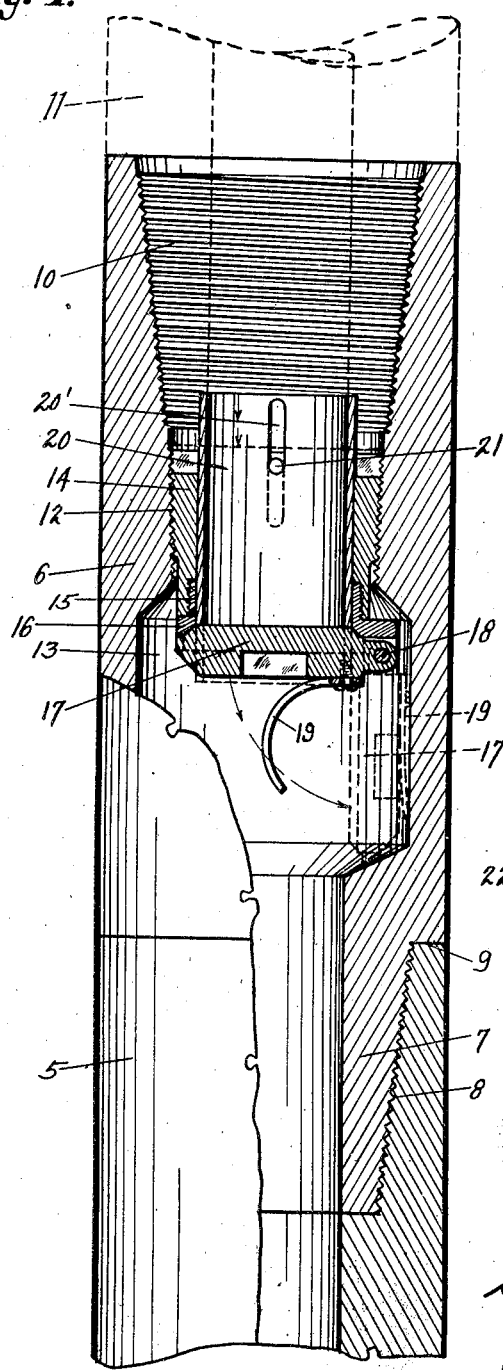
Figure 2:
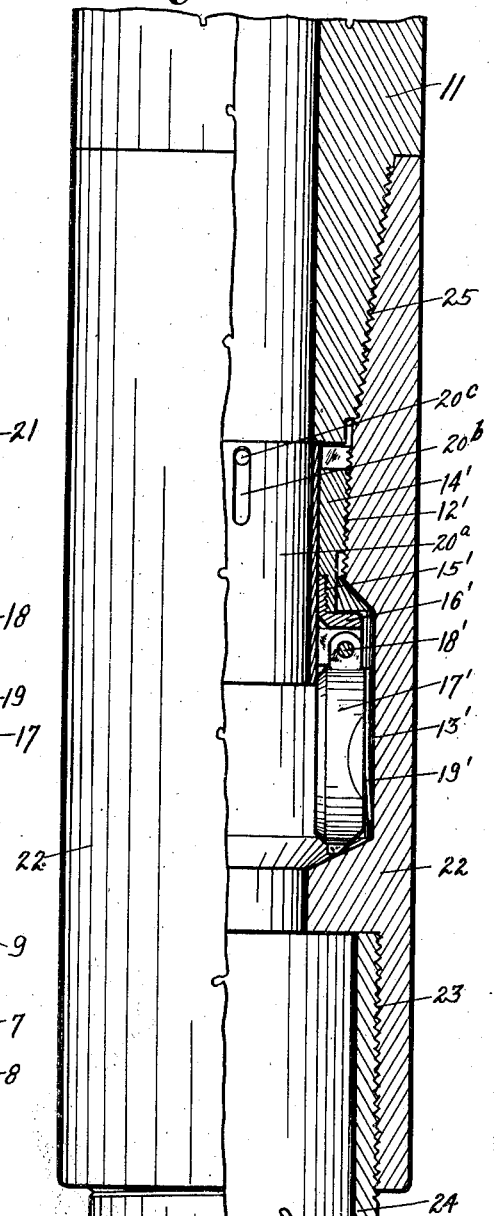

Figure 1 is a longitudinal sectional view through an intermediate member embodying my invention, the valve being shown closed in full lines, and indicated in open position in light broken lines;

Figure 2 is a similar view of a modified form of the invention showing a tool joint with the valve mechanism embodied in the box end of said tool joint, the valve being shown in the open or inoperative position in full lines; and Figure 3 is a similar view of another modified form of the invention showing the valve-containing member with the connecting member being screwed into place and valve-opening part thereof partially screwed down and the valve partially open.

Referring now to Fig. 1, 5 designates the box end of a tool joint, 6 an intermediate member having a pin end 7, having the coarse threads 8 used for quick action, and the close fitting shoulder 9. At its upper end, said intermediate member 6, is provided with the tapered, coarse threaded end 10, to receive the pin end of another joint member, 11, indicated in light broken lines, and on its interior said member 6 is provided with a threaded section 12, and with an annular enlargement 13, of substantially the form shown.

An externally threaded bushing 14, is internally threaded at its lower end, as at 15, and into the end of said bushing is screwed a valve seat member 16, having a clapper valve member 17, hinged thereto at 18, and adapted to close on said valve seat member 16, in the manner indicated in full lines, Fig. 1, or to swing back into the annular recess or space 13, as indicated in light broken lines. Said valve member has a spring 19 thereon adapted to normally move said valve outwardly far enough so that any upflow through the drill pipe would close it. Mounted to move in the bushing 14, is a sleeve or tubular member 20, provided with slots 20' to receive pins, as 21 from the bushing, whereby said member 20 can move within certain limits, as indicated in light broken lines, and when forced down, it operates to force the valve member open and back into the annular recess in which it is shown in light broken lines. In its upper position, shown in full lines, said tubular member or sleeve is in position to be engaged and moved downwardly by the pin end of a tool joint screwed into the upper end of said intermediate member 6, as indicated in light broken lines.

Referring to Fig. 2, I have shown my improved valve mechanism embodied in the box end of a tool joint. The box is designated 22, having the usual pipe receiving threads at 23, to receive a section of drill pipe 24, and at its upper end, said box has the usual tapered, pin-receiving end, 25. Said box 22 is shown provided internally with a threaded section 12', to receive a bushing 14', which bushing is internally threaded at its lower end, as at 15', to receive a valve seat member 16', with clapper valve 17', hinged therein at 18', and shown swung back into the annular recess 13', in said box 22, and held there by means of a sleeve or tubular member 20', which is shown moved to its down position by the pin end of the tool joint shown in place therein. The valve is provided with the spring 19'. The sleeve member 20$^a$ is also shown in its down position, with its limit slot 20$^b$ and stop pin 20$^c$. These parts are all similar to the parts in Fig. 1, and are designated with the same numerals provided with the prime point, or with small letter exponent.

When the pin end of a tool joint is unscrewed to disconnect a section of drill pipe, it will be seen that the spring 19 or 19' will operate to move the valve outwardly and raise the sleeve 20$^a$ to its up position, as shown in Fig. 1, thus the valve automatically closes when the pin end of a drill tool joint is removed, and it is automatically opened as the pin end of the joint is screwed into the upper end of the intermediate member in Fig. 1, or the upper end of the box member in Fig. 2. The principle is the same and the operation is the same.

The two members of a tool joint which are screwed on to the ends of the drill pipe frequently become so tightly locked thereto that they cannot be removed and in order to make it possible to take advantage of my invention in connection with standard equipment, I have suggested the intermediate member, complete in itself, and adapted to be interposed between the two regular members of a tool joint. In new equipment, the invention can be embodied in the box end of the standard tool joint and thus every tool joint would be equipped with the means for automatically closing the passage through the drill pipe and the joint, so that when a joint was disconnected, the valve in that joint would automatically close, as before described.

It will be understood, of course that the passage through a drill pipe must be kept open and of uniform size and there can be no constrictions or obstructions therein which would obstruct the passage of the circulating fluid therethrough. My inventions makes provision for automatic valve mechanism and at the same time keeps the passage of smooth and uniform size through the joints and the drill pipe.

Referring to Fig. 3, I have shown a connecting mechanism for quick attachment to a tool joint in place of the pin end of a joint member and which can be attached thereto without causing the opening of the valve, as is the case when the standard pin end of a coupling member is connected with the box end or the corresponding end of the intermediate member. This connecting mechanism has means therein which can be operated after the coupling has been made for forcibly opening the valve.

In the drawings, the valve containing member, whether it be a regular box end of a coupling member, or an intermediate member as previously described, is designated 6, corresponding with the general construction in Fig. 1, and I have also used the same reference numerals as used in Fig. 1 for the valve mechanism and related parts. The upper end of the valve containing member has the tapered, coarse threaded end 10, to receive the pin end of a joint member, or other correspondingly tapered and threaded member. The bushing 14, the valve seat member 16, the valve 17, the spring 19, are all shown in Fig. 3, also the sleeve 20.

Assuming now that when a section of drill pipe was disconnected from the member 6, which would be on the upper end of the drill pipe in a well, that there was a flow, or blow out which held the valve member 17 closed. To connect another section of drill pipe thereto would open the valve and allow the flow to pass up through the added section and if it had no valve at its upper end, it would blow out into the atmosphere. To take care of this situation, I have provided a special connecting member for connecting the drill pipe in the well with a pipe line and after the connection, to open the valve and permit the flow therethrough.

This connecting member comprises a body 26, having at its lower end a pin end, tapered and coarsely threaded at 27 to couple with the member 6, and having a fitted shoulder at 28 to rest upon the upper end of said member 6, said body member having a branch pipe connecting opening at 29, with which a pipe line 30 is connected. Within said body is a plunger member 31, with bore thereinto from its lower end, as indicated at 31', with outlets 32, 32, through its side, near its upper closed end. The diameter of said plunger member is reduced, as at 33, at a location which includes the outlets 32, and also in register with the connecting opening 29, as indicated. The lower end of said plunger member is adapted to engage the upper end of the sleeve 20. The pin end, or the tapered end of said body, has a larger internal diameter than the outside diameter of the sleeve 20, so as not to engage said sleeve 20, when screwed into the coupling member. The upper end of the body 26 is reduced in diameter and internally threaded to receive therein a screw plug 34, which is also internally threaded and screwed on to the upper reduced end of the plunger member 31, as at 35, said screw plug 34 having a head 34' adapted to receive a wrench or other operating tool, whereby it can be turned together with the plunger down into the body 26, for forcing said plunger downwardly sufficiently to engage the sleeve 20 and move it down to open the valve 17. It is shown partially down in the drawings, Fig. 3, and the valve partially open. When it has been sufficiently screwed down to open the valve 17 fully and position the sleeve over the valve member, I have provided a cap 36 adapted to screw onto the upper end of the body 26, and over the screw plug head 34', as clearly illustrated.

Thus the drill pipe is connected with a pipe line 30, and the valve 17 has been forced open and the upper part of the body is securely closed and any flow of gas or oil is out through the pipe line 30, as will be understood from the showing made.

In operating a rotary drilling unit, it becomes necessary to remove the drill pipe from the hole at frequent intervals in order to change drilling bits, or for other purposes. As this is accomplished, it is not infrequent that a well starts producing or to flowing while these drill pipe sections are being withdrawn, and due sometimes to the lowering of the mud fluid level in the well as the displacement represented by the drill pipe volume decreases. While a drill pipe is being pulled out of the well, there is an open tool joint at all times, either at some point in the derrick or at the derrick floor. It will be seen, therefore, that with one of my automatic valve joints at each tool joint connection, the well would be fully protected from premature blowouts through the drill pipe, or to flow out of control through the drill pipe, as has occurred on many occasions.

I do not limit my invention to the details of construction and arrangement shown, realizing that many changes can be made therein without departing from the spirit of the invention, and it is my intention that any embodiment on which the hereto appended claims can fairly be read shall be considered as another embodiment of the invention.

I claim:

1. A pipe joint member having a recess offset in its side from the passageway therethrough, a valve for closing said passageway and movable outwardly into said recess to open said passageway, a member in said joint adapted to be moved to engage and open said valve, said member holding said valve back in said recess, said member being adapted to be engaged and moved by the connection of another joint member thereto, and means normally operating to move said valve out of said recess to closed position when released by said member.

2. A two part pipe joint, one part having a recess in its inner side outside of the passageway therethrough, a valve member for closing said passageway and mounted in said part to be moved back into said recess to open said passageway, a member in said part adapted to be engaged and moved by the other part of said joint when connected thereto, said member being moved to engage and open said valve and hold it back in said recess, and means for automatically moving said valve out of said recess to close said passageway when released by said member.

3. In a tool joint, a part having a recess therein offset from the passageway therethrough, a valve member hinged in said part to be moved to close said passageway and to be moved back into said recess to open said passageway, a tubular member therein adapted to be engaged and moved endwise by another part of said tool joint when coupled thereto, said tubular member being adapted to engage and move said valve member back into said recess to open said passageway, and spring means operating to move said valve member out of said recess when released by said tubular member.

4. In a tool joint having two parts to be coupled, one of said parts being provided with a recess offset from the passageway therethrough, a valve seat member mounted therein, a valve member hinged thereto to seat on said valve seat with its hinge in said recess, the passageway through said valve seat member corresponding in size to the passageway through said tool joint, a tubular member movable through said valve seat member and adapted to engage and open said valve member back into said recess, said tubular member being positioned to be engaged and moved by the other part of said tool joint when coupled thereto, and means for automatically moving said valve member and said tubular member when said other part of said tool joint is uncoupled therefrom, whereby to automatically close said passageway.

5. In a tool joint of the character referred to, a part having an annular recess formed therein outside of the passageway therethrough, a valve seat member mounted in said part, a valve hinged thereto with its hinge in said recess, whereby said valve can swing back into said recess, a tubular member movable in said valve seat member to engage and open said valve into said recess, means normally operating to move said valve out of said recess when released by said tubular member, a connecting member adapted to be coupled to said tool joint part, a plunger in said member, means for forcing said plunger member inwardly to engage and move said tubular member to open said valve in said tool joint part, and means whereby said connecting member is closed at its outer end.

6. A pipe joint having a recess offset in its side from the passageway therethrough, a valve for closing said passageway and movable outwardly into said recess to open said passageway, means operating to normally move said valve into closed position to close said passageway when unheld, a member in said pipe joint adapted to be moved to engage and open said valve, a connecting member adapted to be coupled to said pipe joint, a movable part in said connecting member closing the upper end thereof and movable to move the member in said joint for forcing said valve into open position and into said recess.

7. In a pipe joint member a valve adapted to be automatically closed when unheld to close the passageway through said pipe joint member, a member adapted to be connected with said pipe joint member, a plunger member in said second member adapted to be moved inwardly to force said valve open, means for forcing said plunger member inwardly to open said valve, said means closing the outer end of said second member.

8. A tool joint member having therein a valve adapted to move across and close the passageway through said tool joint member when unheld in its open position, a tubular member therein and movable endwise to force said valve to open position, a second member adapted to be coupled to said tool joint member, said second member having therein a member adapted to be moved into engagement with the tubular member in said tool joint member for moving it to open said valve, screw means for moving the member in said second member, said screw means closing the outer end of said second member.

9. In combination with a drill pipe, a tool joint member having therein a valve adapted to close the passageway there-through and movable back out of said passageway, a valve moving member in said tool joint member and adapted to be moved to open said valve, a coupling member adapted to be screwed into said tool joint member, said coupling member having therein a plunger member adapted to be moved to engage and move said valve moving member after said coupling member is screwed into said tool joint member, screw means in the end of said coupling member for moving said plunger member.

10. In combination with a pipe, a coupling member, a valve therein movable back out of the passageway therein, means normally operating to move said valve to close said passageway, a valve moving member in said coupling member and adapted to be moved to force said valve to open position, a second coupling member adapted to couple to said first mentioned coupling member, a plunger in said second coupling member for engaging and moving said valve moving member when said coupling members are coupled together, means closing the outer end of said second coupling member and adapted to operate said plunger.

11. A drill stem comprising tubular members threaded for screwing together, one of said members provided with a valve seat in its bore, a valve to close on said seat mounted to swing into open position to one side of said seat, a spring to yieldingly bias the valve toward closed position, and a means within the bore of one of said members operable by screwing together of said members to engage and open the valve.

12. A drill stem comprising two tubular members threaded for screwing together, one of said members provided with a valve seat in its bore, a valve to close in said seat mounted to swing into open position to one side of said seat, a spring to yieldingly bias the valve toward closed position, and a third tubular member slidably mounted in the bore of said one member and engaging the valve, said third tubular member being of a length to be engaged by the other of said two tubular members when the said two tubular members are partly unscrewed and the valve is closed, said third tubular member being of a length to admit of the said two tubular members being fully screwed together when the valve is open.

Signed at Los Angeles, Los Angeles County, California, this 14th day of May, 1929.

BERNARD H. SCOTT.